(12) United States Patent
Mohri et al.

(10) Patent No.: US 6,574,597 B1
(45) Date of Patent: Jun. 3, 2003

(54) FULLY EXPANDED CONTEXT-DEPENDENT NETWORKS FOR SPEECH RECOGNITION

(75) Inventors: Mehryar Mohri, New York, NY (US); Michael Dennis Riley, New York, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/502,501

(22) Filed: Feb. 11, 2000

Related U.S. Application Data

(63) Continuation of application No. 09/074,886, filed on May 8, 1998, now abandoned.

(51) Int. Cl.[7] ............................................... G10L 15/00
(52) U.S. Cl. ..................... 704/251; 704/255; 704/256; 704/257
(58) Field of Search ................................ 704/255, 256, 704/231, 232, 242, 243, 250, 251, 257

(56) References Cited

U.S. PATENT DOCUMENTS

| | | | | |
|---|---|---|---|---|
| 5,129,001 A | * | 7/1992 | Bahl et al. .................... | 704/251 |
| 5,293,451 A | * | 3/1994 | Brown et al. ................ | 704/245 |
| 5,390,279 A | * | 2/1995 | Strong ......................... | 704/251 |
| 5,621,859 A | * | 4/1997 | Schwartz et al. ............ | 704/251 |
| 5,937,384 A | * | 8/1999 | Huang et al. ................ | 704/256 |
| 5,983,180 A | * | 11/1999 | Robinson ..................... | 704/254 |
| 6,167,377 A | * | 12/2000 | Gillick et al. ................ | 704/240 |

OTHER PUBLICATIONS

Riley etal. "full expansion of context dependent networks in large vocabulary speech recognition".*

* cited by examiner

*Primary Examiner*—Daniel Abebe

(57) ABSTRACT

A large vocabulary speech recognizer including a combined weighted network of transducers reflecting fully expanded context-dependent modeling of pronunciations and language that can be used with a single-pass Viterbi or other coder based on sequences of labels provided by feature analysis of input speech.

20 Claims, 5 Drawing Sheets

FULLY EXPANDED CONTEXT-DEPENDENT NETWORKS FOR SPEECH RECOGNITION

RELATED APPLICATION

This application is a continuation of U.S. patent application Ser. No. 09/074,886, filed May 8, 1998 now abn.

FIELD OF THE INVENTION

The present invention relates to speech recognition systems and methods using weighted-automata networks. More particularly, the present invention relates to such networks comprising transducers corresponding to speech recognition system elements, such as a pronunciation dictionary and acoustic, language and context-dependency models. Still more particularly, embodiments of the present invention relate to such networks in which context-dependency is reflected in efficient fully expanded models for large vocabularies.

BACKGROUND OF THE INVENTION

Workers in the field of speech recognition have developed a number of useful systems, functionalities and techniques, which, when used individually or in combination increase the accuracy and speed of automatic machine recognition of input speech signals. For example, it has proven advantageous to identify and implement various models pertaining to speech and methods for recognizing speech. Thus, acoustic models, context-dependency models, language models and pronunciation dictionaries are often part of an overall speech recognition system.

One technique that has proven valuable in implementing speech recognition systems is the representation of the collection of models and elements in a speech recognition system as a network of finite-state transducers. See, for example, Berstel, J., *Transductions and Context-Free Languages,* Teubner Studienbucher, Stuttgart, Germany, 1979; Eilenberg, S., *Automata, Languages, and Machines,* Vol. A, Academic Press, San Diego, Calif., 1974; Kuich, W., and A. Salomaa, *Semirings, Automata, Languages,* No. 5 in EATCS Monographs on Theoretical Computer Science, Springer-Verlag, Berlin, Germany, 1986.

Such transducers are finite-state networks in which each arc is typically labeled with an input symbol, an output symbol and weight (often probability, or negative log probability). Optionally, the input (output) symbol on an arc may be the null symbol, ,, indicating that the arc does not consume input (produce output). A path in a transducer pairs the concatenation of the input labels on its arcs with the concatenation of the corresponding output labels, assigning the pair the extend function of the arc weights (often the sum function).

The transducer representation of models provides a natural algorithm, composition, for combining multiple levels of modeling. The composition of two weighted transducers, S and T, is a transducer S B T that assigns the weight w to the mapping from symbol sequence x to sequence z just in case there is some symbol sequence y such that S maps x to y with weight w, T maps y to z with weight v, and w=extend (u,v). The states of S B T are pairs of a state of S and a state of T, and the arcs are built from pairs of arcs from S and T with paired origin and destination states such that the output of the S arc matches the input of the T arc (null transition, ,, labels need to be handled specially). It is well known and readily demonstrated that the composition operator B is associative, i.e., the order of the B operations does not matter.

Using a transducer composition algorithm, weighted automata have proven useful in combining input acoustic observations with a pronunciation dictionary and acoustic, context-dependency and language models for speech recognition applications. See, for example, Mohri, M., F. Pereira, and M. Riley, "Weighted automata in text and speech processing," in *ECAI-96 Workshop, Budapest, Hungary,* 1996; and Pereira, F., and M. Riley, "Speech Recognition by Composition of Weighted Finite Automata," in *Finite-State Language Processing,* Ir E. Roche and Y. Schabes, editors, pp. 431–453, MIT Press, Cambridge, Mass., 1997. These papers are hereby incorporated by reference and should be considered as set forth in their entirety herein.

Particular models that can be implemented in transducer form include the language model and dictionary. While it is generally not possible to combine these models into a single network when the models are dynamically changing, the possibility exists for fixed models that a combined network might be realized in advance of use. However, the practicality of such a combined network depends on the optimization methods used. If these methods are not properly chosen in constructing a combined model, the size of the combined network can increase beyond reasonable limits. In particular, fully expanded context-dependent networks including cross-word context-dependent models with a pronunciation dictionary and an n-gram language model have proven to be too large to be stored or used in an efficient speech recognizer for large vocabulary applications.

SUMMARY OF THE INVENTION

The limitations of the prior art have been overcome and a technical advance made in accordance with the present invention described in illustrative embodiments below.

In accordance with an aspect of the present invention, networks representing various phases of the automatic speech recognition process are combined and optimized by moving labels and weights in such manner as to permit the merging or collapsing of paths in such network while preserving the desired mappings between input strings and corresponding output strings and weights. Deterministic minimal transducers are realized using a novel method that provides a compact representation of the overall recognition network.

In one illustrative embodiment, transducers reflecting fully expanded context dependency and dictionary and language models are combined in such a practically realizable network. In particular, fully expanded context-dependent phone models for a large vocabulary application may be realized while modestly increasing the model size compared with the corresponding word-level n-gram language model. An improved model of these proportions can be directly processed by a well-known (e.g., Viterbi) decoder without dynamic expansion.

In realizing such a fully expanded model, context dependency constraints are represented by a transducer C, rather than being imbedded in the decoder. Such transducer representation permits variation of alternative context dependencies, and alternative combinations of context dependencies with other models. This flexibility offers increased choices in selection of optimization techniques for weighted automata while avoiding any need for changes to the decoder.

Structuring of illustrative fully expanded networks advantageously employs an efficient transducer composition organization and method. In addition, transducer determinization is advantageously employed in illustrative embodiments to reduce the number of alternative arcs that need be considered during decoding. Moreover, removal for weighted automata is desirably effected in developing combined models. Using present inventive methods and systems, an optimized network is advantageously structured a priori, rather than on the fly or with special knowledge of a particular input string. Such organizational structure provides greater operational efficiencies for a wide range of input speech.

Embodiments of the present invention are used in illustrative problems involving the North American Business News (NAB) speech recognition task to demonstrate the practical realization of speech recognizers.

BRIEF DESCRIPTION OF THE DRAWING

The present invention will be more fully understood upon consideration of the following detailed description of illustrative embodiments taken in light of the included drawing, wherein.

DETAILED DESCRIPTION

Figure 1:
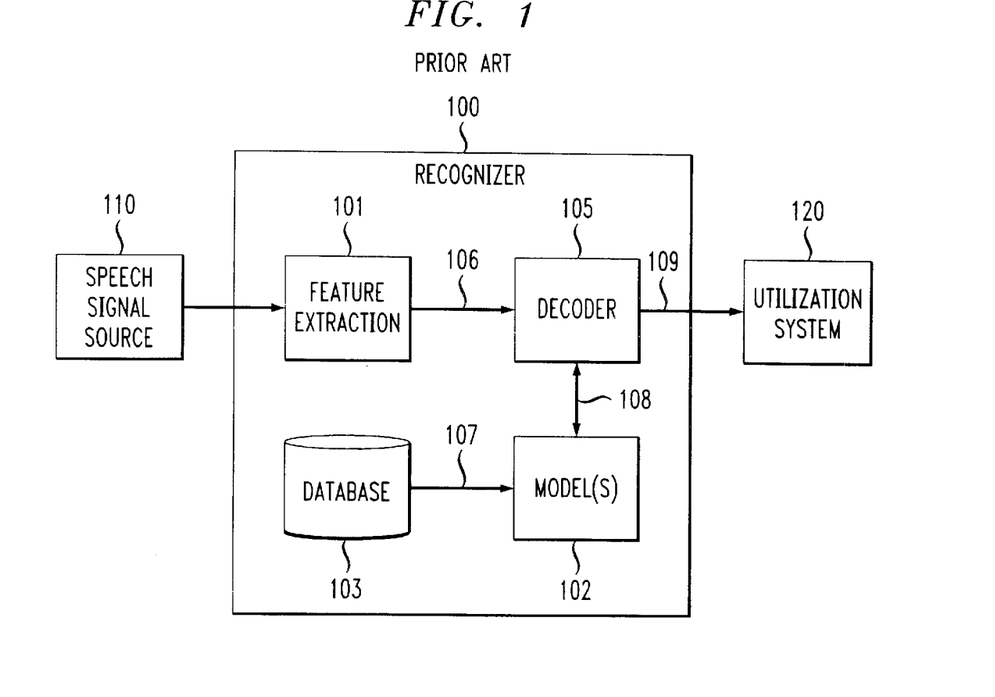
FIG. 1 is an overall representation of a speech recognition system of a type known in the prior art that may be adapted in accordance with the teachings of the present invention, and in which inventive methods and apparatus of the present invention may be used.

FIG. 1 shows a block diagram of an overall speech recognition system known in the prior art. There, a speech recognizer 100 is shown receiving input speech signals from source 110 and delivering recognized speech to a utilization system 120. Speech signals input to speech recognizer 100 from source 110 may be provided directly by a microphone or similar device for producing analog speech signals, or such input signals may be sampled, quantized coded signals—as is well known in the art. Moreover, speech signal source 110 may include storage facilities for storing sequences of speech signals to be supplied for training and testing of recognizer 100. Such storage in source 110 may also be used to provide input sequences for normal operation of speech recognizer 100. Utilization system 120 may be of one or more well-known types, e.g., a memory for storage of recognized speech in the form of text or other transcripts. Alternatively, utilization system 120 may include a subsystem responsive to recognized speech in the form of direction or commands for controlling a process or system. Other operations that may be performed by utilization system 120 include filtering or selection of particular inputs to system 120 and display or other recordation of recognized speech. Combinations of these and other well-known utilization system operations may be employed as well.

Speech recognizer 100 shown in FIG. 1 includes a feature extraction processor 101 for receiving input speech signals from source 110 and delivering corresponding output signals to model 102 on output 106 in a form suitable for processing by model 102. If source 110 provides input analog speech signals to recognizer 100, then feature extraction processor 101 will include well-known sampling, quantizing and coding of input signals as will be appropriate in particular cases.

In addition, feature extraction processor 101 will provide such analytical, transformation and feature extraction functionality as is useful for subsequent processing by other system elements. In particular, feature extraction processor 101 typically operates on input speech signals to identify such frequency, cepstal, linear prediction, correlation, vector quantization or other signal characteristics as can be associated with speech phones or other speech elements. Such feature extraction processing is well-known in the art as described, e.g., in Davis, S. B. and P. Mermelstein, "Comparison of parametric representations of monosyllabic word recognition in continuously spoken sentences," IEEE Trans. Acoust. Speech, Signal Process.ASSP-28(4): 357–366, and Rabiner, L. R., B. H. Juang, S. E. Levinson, and M. M. Sondhi, "Recognition of isolated digits using hidden Markov models with continuous mixture densities," *AT& T Tech. J.* 65(3):21–31. Output from feature extraction processor 101 typically includes a sequence of so-called "labels" identifying features of the input speech, often with attached probabilities for such labels. It is the function of decoder 105 in FIG. 1 to receive the output of the feature extraction processor 101 and, with reference to one or more speech models represented by block 102 and associated database 103, to determine the spoken input.

Model block 102 shown in FIG. 1 represents one or more of an acoustic model, a language model, a context-dependency model or such other models as may prove convenient in a particular recognizer. Combinations of individual models are also used in speech recognizers of the type shown in FIG. 1.

The present invention, in its various embodiments, provides, inter alia, improved models for use in a system of the type shown generally in FIG. 1, and provides efficient methods for structuring and using such improved models in combination with other recognizer elements, including those shown in FIG. 1. In particular, the individual models are typically represented by their respective transducers, viz., a context-dependency transducer, C, a dictionary transducer, L, and a language model, G. In transducer form, model 102 shown in FIG. 1, as adapted and improved in accordance with aspects of the present invention, comprises the composition of transducers, C, L and G, i.e., C B L B G. Each of the transducers C, L and G will be described separately after a brief review of characteristics of finite-state machines (acceptors and transducers) useful in implementing speech recognition systems and methods.

Weighted Automata—Acceptors and Transducers

Prior work has adopted the use of weighted automata in representing various aspects of speech recognition. See, for example, the Mohri, et al *ECAI*-96 paper and Pereira, et al paper in *Finite-State Language Processing* referenced above and incorporated herein. FIGS. 2(a) through 2(d) reproduce representation of models represented as weighted transducers in the first of these two papers.

Figure 2A:
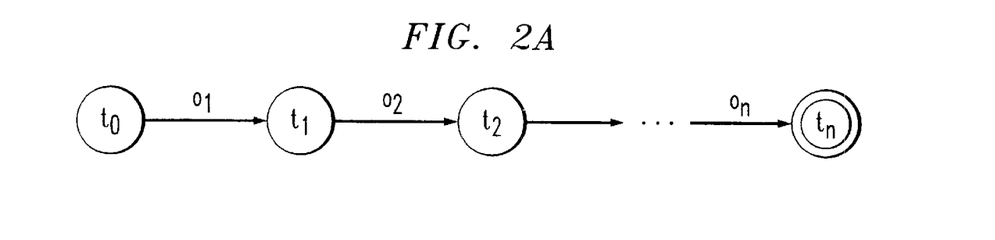
FIGS. 2A–2D show finite state machine representations of structures for a number of models useful in speech recognizers known in the prior art.

In particular, FIG. 2A represents an acoustic observation acceptor O for an illustrative vector-quantized representation of a given utterance. Each state represents a point in time, $t_i$, and the transition from $t_{i-1}$ to $t_i$ is labeled with the name $o_i$ of the quantization cell that contains the acoustic parameter vector for the sample at time $t_{i-1}$. For continuous-density acoustic representations, there is a transition from $t_{i-1}$ to $t_i$ labeled with a distribution name and the likelihood of that distribution generating the acoustic-parameter vector, for each acoustic-parameter distribution in the acoustic model.

Figure 2B:
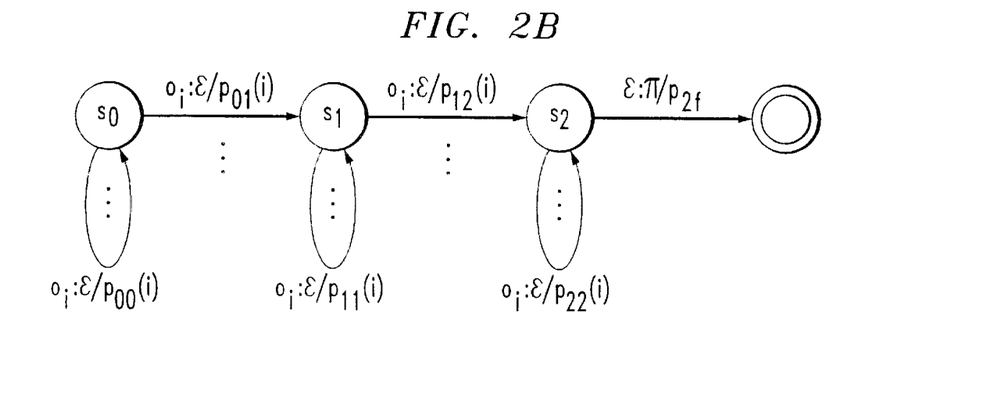

A representation of a common topology for an acoustic-observation-sequence-to-phone-sequence transducer A is shown in FIG. 2B. Transducer A is built from context-dependent (CD) phone models. Such CD phone model is a transducer from a sequence of acoustic observation labels to a specific context-dependent unit, and assigns to each acoustic sequence the likelihood that the specified unit produced it. Thus, different paths through a CD phone model correspond to different acoustic realizations of a CD phone. A full acoustic-to-phone transducer A is then defined by an appropriate algebraic combination of CD phone models.

Figure 2C:
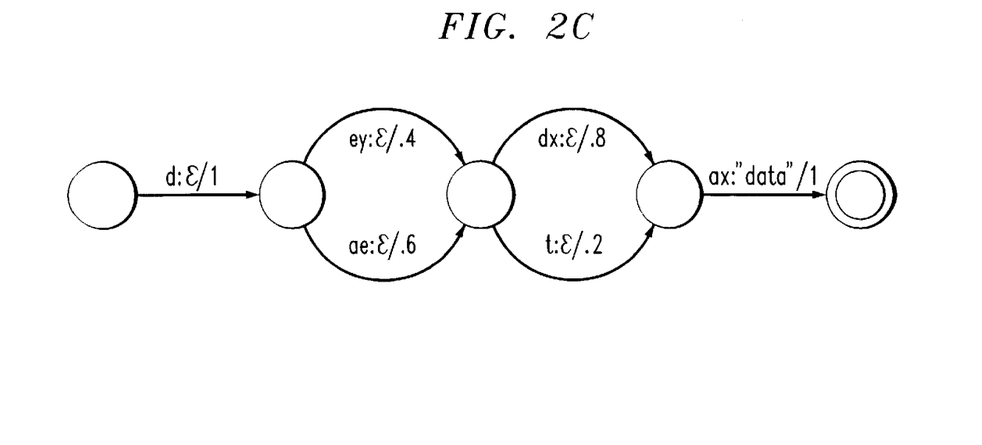
Figure 2D:
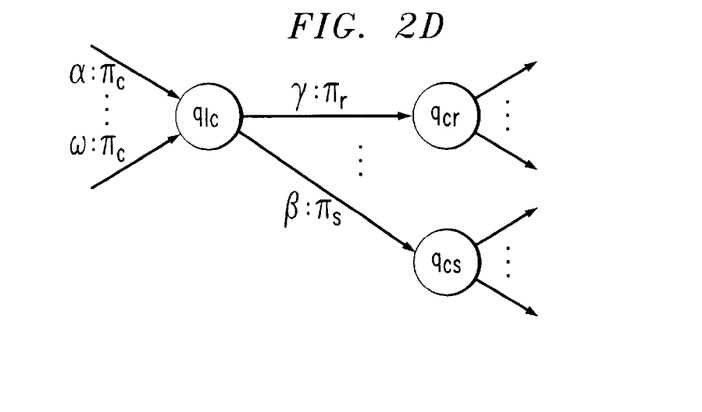

A representation of an illustrative triphonic context-dependent model C is depicted in FIG. 2D. For each context-dependent phone model (that corresponds to the (context-independent) phone $B_c$ in the context of $B_l$ and $B_r$, there is a state $q_{ic}$ in C for the biphone $B_l B_c$, a state $q_{cr}$ for $Bc_c B_r$ and a transition from $q_{ic}$ to $q_{cr}$ with the input label (and output label $B_r$.

A transducer L for the conversion of phone sequences to word sequences is defined in a manner similar to A. Word models are first built as transducers from sequences of phone labels to a specific word, which assign to each phone sequence a likelihood that the specified word produced it. Thus, different paths through a word model correspond to different phonetic realizations of the word. FIG. 2C shows a typical word model. L is then defined as an appropriate algebraic combination of word models. Finally, a language model M, e.g., an n-gram model of word sequence statistics, may be easily represented as a weighted acceptor.

Figure 3:
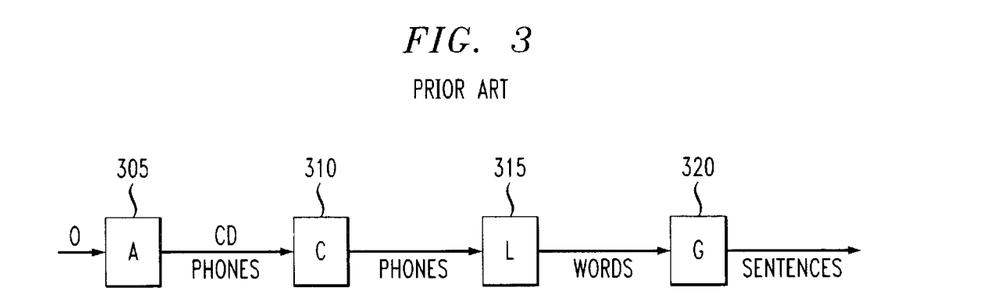
FIG. 3 shows a cascade of transducers as used in typical prior art speech recognizers.

Using the models just described, including those of FIGS. 2A–2D, the overall recognition task can, by one common approach, be expressed as the search for the highest-likelihood string in the composition O B A B C B L B G of the described transducers. This is an acceptor assigning each word sequence the likelihood that it could have generated the given acoustic observations. The Mohri, et al *ECAI-96* reference describes the use of a standard Viterbi solution for determining the highest probability path. FIG. 3 illustrates a cascade of transducers corresponding to the just-described combination of transducers.

Full Expansion of Context-Dependent Networks for Large Vocabularies

For purposes of illustrating embodiments of the present invention, it proves convenient to consider a combined model including a context-dependency transducer, C, a dictionary transducer, L, and a language model, G. The composition CB LB G of a combined model may be represented in a block diagram, as a cascade of the individual components, as was the case for the elements shown in FIG. 3.

Context-dependency transducer C maps sequences of names of context-dependent phone models (HMMs) to the corresponding phone sequences. The topology of this transducer is determined by the particular kind of context dependency used in modeling (e.g. triphonic, pentaphonic, or tree-based). For explanatory convenience the examples and some of the discussion will use the inverse, $C^{-1}$, of C, which maps phone sequences to Hidden Markov Model (HMM) context-dependent model name sequences. For example, the transducer shown in FIG. 4, $C^{-1}$, encodes triphonic context dependency for two hypothetical phones x and y. It does not represent a simple substitution, since it describes the mapping from context-independent phones in context-dependent HMMs, denoted here by phone/left context_right context.

Figure 4:
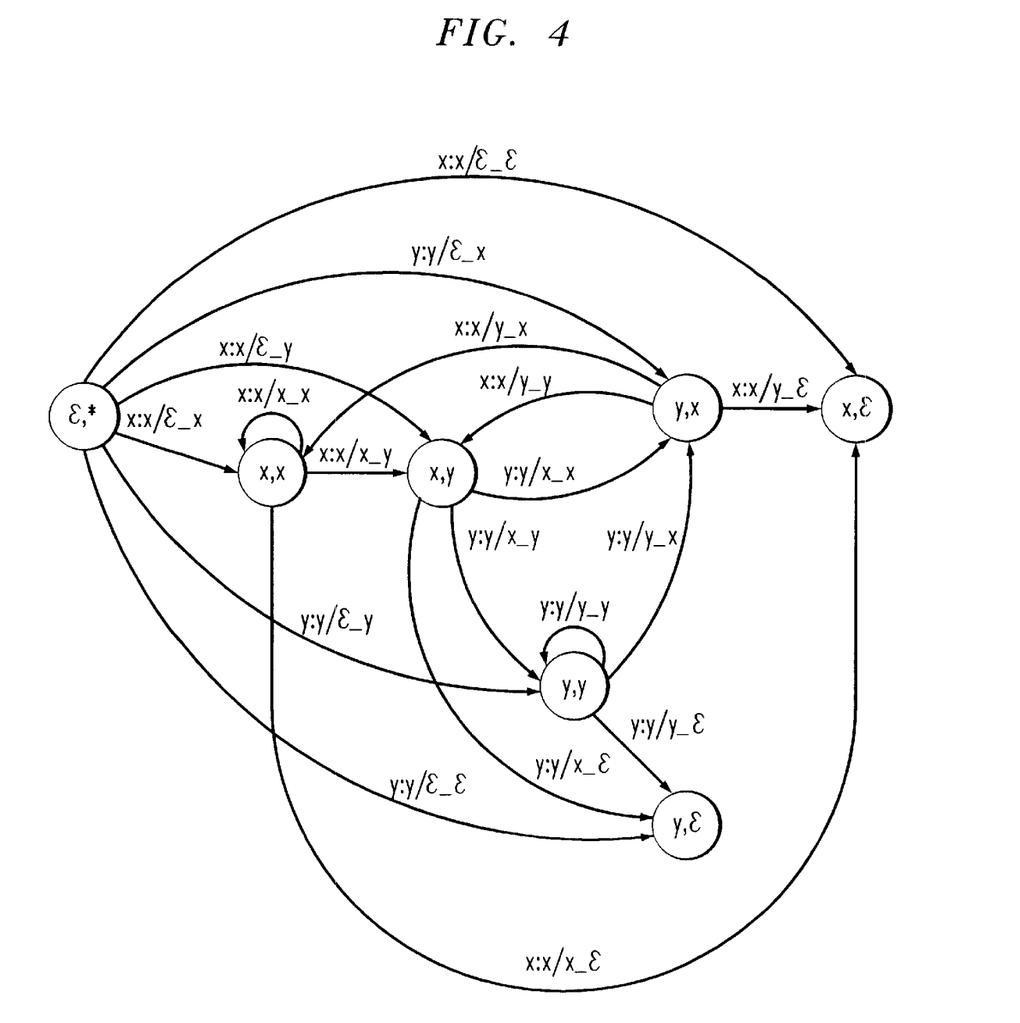
FIG. 4 shows a state representation of an illustrative non-deterministic context-dependency model.

Each state (a,b) encodes the information that the previous phone was a and the next phone is b;, represents the start or end of a phone sequence and * an unspecified next phone. For instance, it is easy to see that the phone sequence xyx is mapped by the transducer to x/,_y y/x_x x/y_, via the unique state sequence (,,*)(x,y)(y,x)(x,,).

Dictionary transducer L represents word pronunciations, mapping phone sequences to their possible segmentations into word sequences according to a (possibly multiple) pronunciation dictionary.

Language model G represents the probabilities of word sequences, mapping a sequence to itself with a weight corresponding to the language model probability of the word sequence. In general, any finite-state language model can be used, though it has been found useful for a range of applications to use n-gram models, with n=2,3.

Each path in the composition C B L B G pairs a sequence of HMM context dependent model names with a word sequence, assigning it a weight corresponding to the likelihood that the word sequence is pronounced as specified by the HMM context dependent model sequence. The composition CB LB G thus serves as the modeling network for supplying input signals to a standard (e.g. Viterbi) decoder in the usual way. Such a standard decoder is represented in FIG. 1 by the decoder 105. Other particular decoders will be used for particular applications, as will occur to those skilled in the art.

A distinct advantage of the presently-described approach is that representation of context dependency constraints by a transducer C rather than as part of the decoder allows for alternative types of context dependency and alternative combinations of the context dependency transducer with other transducer-based models. This permits advantage to be taken of general optimization techniques for weighted automata and does not require changes to the decoder.

Network Building Algorithm

Building the fully-expanded CB LB G network just described advantageously employs techniques for efficient transducer composition described, for example, in the Mohri, et al, *ECAI-96* paper incorporated by reference.

Straightforward realization of such networks usually results in a high degree of redundancy. That is, many paths correspond to the same word contents (word lattices and language models), or to the same phonemes (pronunciation dictionaries) for instance, with distinct weights or probabilities. More generally, at a given state of a network there might be several thousand alternative outgoing arcs, many of them with the same label. This so-called nondeterminism directly affects the speed of large vocabulary speech recognition systems. Determinization algorithms have accordingly been developed for reducing the alternatives at each state to the minimum number. When fully implemented, a determinization algorithm gives rise to a network in which each state has, at most, one transition labeled with a given element of the alphabet considered (words, phonemes, etc.) Weighted transducer determinization ensures that distinct arcs leaving a state have distinct input labels. Techniques for accomplishing weighted transducer determinization are described, e.g., Mohri, M., "On some applications of finite-state automata theory to natural language processing." *Journal of Natural Language Engineering*, 2:1–20, 1996; Mohri, M., "Finite-state transducers in language and speech processing." *Computational Linguistics*, 23, 1997. Other useful discussions of determinization appear in Mohri, M. and M. Riley, "Weighted Determinization for Large Vocabulary Speech Recognition," Eurospeech 97, and references cited therein. Also useful with respect to the application of determinization and minimization in the context of speech recognition models and transducers is the U.S. patent application Ser. No. 08/781368 entitled "Determinization and Minimization for Speech Recognition, by M. Mohri, F. Pereira and M. Riley filed Jan. 21, 1997 and assigned to the assignee of the present application. This application is hereby incorporated by reference and should be considered as set forth in its entirety herein. Though minimization using, -removal for weighted automata has been accomplished in some prior contexts, embodiments of the present invention employ such techniques to considerable advantage in the context of fully expanded networks, as will be described below.

Clearly, a necessary condition for transducer determinization is that the initial transducer maps each input sequence to at most one output sequence. But this is not sufficient; the mapping must be sequential. See, for example, Berstel, J., *Transductions and Context-Free Languages,* Teubner Studienbucher, Stuttgart, Germany, 1979; and Mohri, M., "Finite-state transducers in language and speech processing." *Computational Linguistics,* 23, 1997. These conditions may be somewhat relaxed to mappings with bounded ambiguity (or p-subsequential, as noted in the last-cited paper by Mohri).

As noted, the purpose of applying determinization to the model network is to decrease the number of alternative arcs that need be considered during decoding. In many cases, the size of the model is also reduced, because redundant paths are eliminated. Previous work in network optimization have used a tree-based construction, which can be viewed as a special limited case of determinization. In addition to avoiding the constraint that networks be constructed as trees, general determinization permits optimization of a wider range of networks, and the results are generally more compact than trees.

Informally, if the original (non-deterministic) transducer maps input uv to x with weight c and input uw to y with weight d, then the determinized transducer will admit a unique way of reading u from the initial state. The output sequence associated to u will be the longest common prefix of x and y and the corresponding weight will be min $\{c,d\}$.

Figure 5:
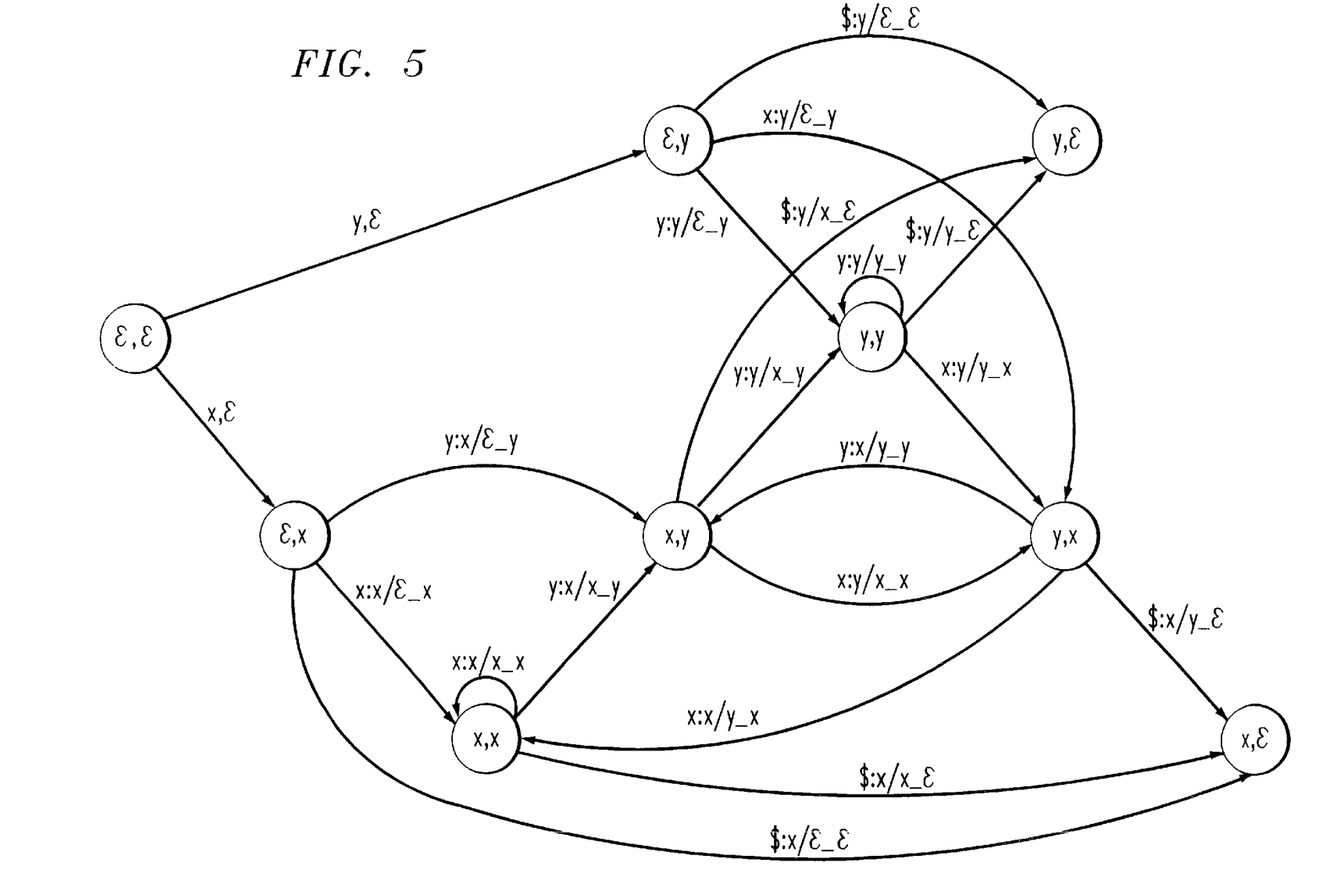
FIG. 5 shows a state representation of an illustrative deterministic context-dependency model derived from the model of FIG. 4.

As a first application of determinization, it is useful to consider that the natural context-dependency transducer $C^{-1}$ of FIG. 4 is not deterministic; a state such as (x,x), for instance, has three outgoing arcs with input label x. However, transducer determinization reading converts it to the deterministic version shown in FIG. 5 ($ is a new end-of-utterance symbol used to make the result sequential). Because of this determinization, the inverse C of $C^{-1}$ has a single arc for each output phone leaving each state, which is essential in building a small and efficient CB LB G.

The determinization of LB G is the most demanding task in the present illustrative network optimization method. First of all, neither L nor G is unambiguous. L may map a given phone string to several alternative words because of homophones. G may also have several paths for a given word sequence—for instance when a variable length or backoff language model is interpreted as a finite-state network allowing all the alternative paths corresponding to different context sequences.

In both cases, the models are disambiguated by labeling the alternatives with auxiliary symbols (possibly on new arcs), yielding two new transducers L' and G' whose composition L'B G' can be determinized. The resulting deterministic transducer P' maps phone strings with interspersed auxiliary symbols to word sequences. The auxiliary labels in P' are then replaced by $\epsilon$ and the weighted $\epsilon$-removal algorithm is applied to yield a transducer P. Useful $\epsilon$-removal techniques are described in the incorporated U.S. patent application Ser. No. 08/781368 cited above, and in Mohri, M., F. Pereira, and M. Riley, "A rational design for weighted finite-state transducer libraries," *Workshop on Implementing Automata,* London, Ontario, 1997 (publication planned by Springer-Verlag).

The final fully-expanded model is then C B P. This transducer is not in general deterministic because the transformation from P' to P can create nondeterminism, but most of the nondeterminism arising from shared phone sequences in the pronunciations of different word sequences will have been eliminated.

Figure 6:
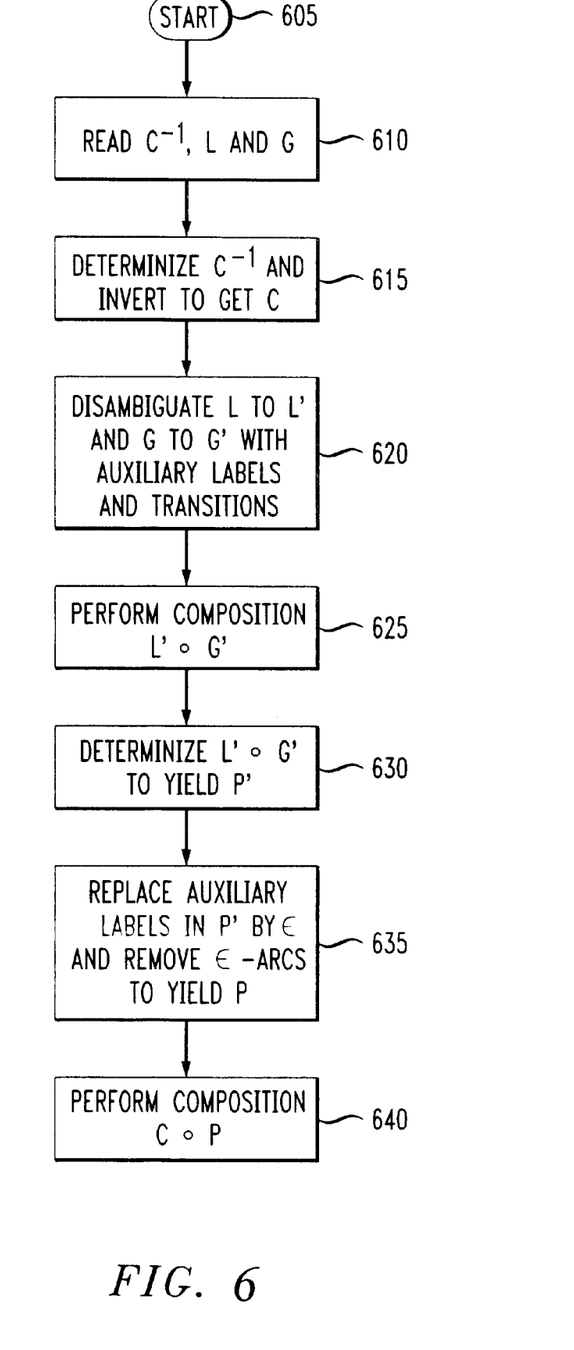
FIG. 6 is a flowchart representation of a method for deriving combined deterministic minimized model in accordance with one embodiment of the present invention.

Thus, referring to FIG. 6, an illustrative compilation of a typical fully-expanded network illustratively includes the following steps:

1. Determinize the inverse of the context-dependency transducer and invert the result to produce C. (Step 615)
2. Disambiguate L into L' and G into G' by introducing auxiliary labels and transitions. (Step 620)
3. Perform the composition L'BG'. Step (625)
4. Determinize L'BG' to yield P'. Step (630)
5. Replace the auxiliary labels in P' by $\epsilon$ and remove $\epsilon$-arcs to yield P. (Step 635)
6. Perform the composition C B P. (Step 640)

Some Typical Applications and Results

The above-described method and associated system has been used to create fully-expanded models for a variety of large-vocabulary recognition tasks. The models are readily tested in a simple general-purpose one-pass Viterbi decoder. The decoder makes no special provision for context-dependent models, since context-dependency constraints are represented in the transducer C and merged by composition into the overall expanded network. Typical results presented below give the sizes of the individual models and of the intermediate and fully-expanded networks for the well-known North American Business News (NAB) task using bigram and trigram language models and vocabulary sizes that range from 10,000 to 160,000 words. Real-time recognition results are also given.

For simplicity and uniformity of presentation, the same illustrative context-dependency transducer C is used in all results. The illustrative transducer, which has 1523 states and 80,719 arcs, represents triphonic contexts clustered by decision-tree methods that take into account cross-word dependencies. See, for example, Young, S., J. Odell, and P. Woodland. "Tree-based state-tying for high accuracy acoustic modelling" in *ARPA Human Language Technology Workshop,* 1994; distributed by Morgan Kaufmann, San Francisco. As noted above, the input label of each arc in such a transducer names an HMM, while the output label names a phone. There are 25,919 distinct HMMs and 5520 distinct HMM states, each associated to a four-gaussian mixture model.

Table 1 lists the lexicon transducer sizes and out-of-vocabulary rates for several vocabulary sizes. For a vocabulary size V, the V most frequent words in the NAB 1994 text corpus were used. The vocabulary was automatically pre-filtered to remove corpus tokens that were deemed implausible words, for instance those that contained no alphabetic characters. The pronunciations for these words were obtained from the AT&T text-to-speech system, and then encoded as the optimized finite-state transducer L. ("OOV" refers to out of vocabulary.)

TABLE 1

Size of lexicon transducers

| Vocab. size | States | Arcs | OOV rate (%) |
|---|---|---|---|
| 10000 | 19146 | 39976 | 5.6 |
| 20000 | 37254 | 78898 | 2.9 |
| 40000 | 71769 | 154076 | 1.4 |
| 160000 | 271356 | 594145 | 0.4 |

Table 2 shows the sizes and test-set perplexities (excluding unknown words) of the various language models used. These were built using Katz's backoff method with frequency cutoffs of 2 for bigrams and 4 for trigrams, as described in Katz, S., "Estimation of probabilities from sparse data for the language model component of a speech recognizer." *IEEE Trans. of ASSP*, 35(3):400–402, 1987. These were then shrunk with an epsilon of 10 using the method of Seymore, K., and R. Rosenfeld. "Scalable backoff language models," in *Proceedings of ICSLP*, Philadelphia, Pa., 1996. Finally, the sizes and test-set perplexities were encoded into (not-deterministic) weighted automata G in the illustrative manner of Ricardi, G., E. Bocchieri, and R. Pieraccini, "Nondeterministic stochastic language models for speech recognition," *Proc. ICASSP*, volume 1, pages 237–240. IEEE, 1995.

TABLE 2

| Vocab. size | N-gram order | States | Arcs | Perp. |
|---|---|---|---|---|
| 10000 | 2 | 10004 | 1960990 | 174 |
| 20000 | 2 | 20004 | 2591547 | 194 |
| 40000 | 2 | 40004 | 3121446 | 212 |
| 160000 | 2 | 160004 | 3818659 | 230 |
| 10000 | 3 | 1861458 | 7002522 | 113 |
| 40000 | 3 | 2771167 | 9195312 | 134 |

Table 3 lists the size of lexicons. In particular, Table 3 shows the sizes of the transducers created by composing lexicon transducers with their corresponding language models and determinizing the result as described above.

TABLE 3

| Vocab. size | N-gram order | States | Arcs |
|---|---|---|---|
| 10000 | 2 | 1381669 | 4177688 |
| 20000 | 2 | 1858768 | 5538887 |
| 40000 | 2 | 2282180 | 6681514 |
| 160000 | 2 | 3050565 | 8232983 |
| 10000 | 3 | 7853810 | 17343182 |
| 40000 | 3 | 11084228 | 23474251 |

Finally, Table 4 lists the sizes for the transducers created by composing the context-dependency transducer with each of the transducers in Table 3. The resulting transducers represent the fully-expanded networks that are searched during decoding.

TABLE 4

| Vocab. size | N-gram order | States | Arcs |
|---|---|---|---|
| 10000 | 2 | 1412769 | 4278821 |
| 20000 | 2 | 1911112 | 5679686 |
| 40000 | 2 | 2352944 | 6849884 |
| 160000 | 2 | 3135226 | 8431949 |
| 10000 | 3 | 8063802 | 17799882 |
| 40000 | 3 | 11353592 | 24018777 |

It becomes clear that the number of arcs in the fully-expanded network is only about 2.1 times that of the language model for bigrams and 2.5 times for trigrams, and so is quite practical for real-time recognition. Moreover, the fully-expanded context-dependent networks in Table 4 are only about 2.5% larger than the corresponding context-independent networks in Table 3. Thus, contrary to conventional wisdom, context-dependency, even with cross-word contexts, does not significantly expand a context-independent phone network if the context-dependency is suitably applied, as in the above-described arrangements.

Recognition accuracy compares favorably with previous good results, e.g., those reported in Ljolje A., M. Riley, and D. Hindle, "Recent improvements in the AT&T 60,000 word speech-to-text system," *ARPA Speech and Natural Language Workshop*, Harriman, N.Y., 1996, distributed by Morgan Kaufmann, San Francisco. Actual accuracy typically improves for recognition times that increase as multiples of real-time when using a single processor, such as a Silicon Graphics Origin 2000. Higher accuracy can be achieved in some cases by using additional techniques, e.g., multi-pass, non-real-time systems and use of more accurate and larger (but typically slower) acoustic models, gender-dependent models, speaker adaptation, multiple-pronunciation networks, wider search beams, and a 5-gram language model.

In general, larger vocabulary size and n-gram order give better real-time performance. Improved modeling in accordance with aspects of the present invention not only gives improved accuracy but also improved speed of recognition. For many applications, however, adding a second (rescoring) pass to apply a stronger language model is suboptimal for real-time performance. In the presently disclosed invention best performance is achieved by using the strongest language model in a single pass.

In the foregoing description, weighted automata have been adapted and configured to provide a new method and resulting structure for creating optimized fully-expanded speech recognition networks for large-vocabulary recognition using context-dependent phone models. In Riley, M., F. Pereira, and M Mohri. "Transducer composition for context-dependent network expansion," *Eurospeech '97*, Rhodes, Greece, 1997, a similar approach was used with on-demand model expansion. Thus, a common framework in which both fully-expanded and on-demand models can be built and used efficiently can be provided in a simple decoder that is unchanged when context-dependency constraints or network combination method change.

A useful general approach to optimization has been incorporated in the foregoing: in the finite-state transducers described, output (word) labels and weights are moved along paths so as to permit the collapsing of paths without losing the correct mapping between each complete input phone string and the corresponding output word string and weight.

While optimization of transducers has been described above in terms of determinization and minimization of traditional kinds, it should be understood that variations of these and other optimization techniques will prove useful in particular cases. Thus, for example, in the case of some ambiguous or otherwise non-determinizable transducers it may prove useful in some applications to perform optimizations on a more local scale. In one example, determinization may be carried out only one some states, e.g., those with particular degrees of non-determinism. Likewise, determinization may be carried out only for a given depth from a start state. Other types of label and weight movements and state and arc reduction techniques may also be undertaken in particular cases.

Appendix A includes supplemental information relating to the present invention.

What is claimed is:

1. A method for making a combined weighted speech transducer for a large-vocabulary context-dependent speech recognizer based on signals representing: (i) the inverse, $C^{-1}$, of a context-dependency transducer; (ii) a word pronunciation transducer, L; and (iii) a language model transducer, G; the method comprising the steps of generating signals representing transducer C, the inverse of a determinized version of transducer $C^{-1}$, generating signals representing transducer P', a determinized version of the composition L'BG', which composition is a composition of disambiguated versions of each of said transducers L and G, generating signals representing a transducer P, a minimized version of transducer P', and generating signals representing said combined speech transducer as the composition C B P.

2. The method of claim 1 wherein said step of generating signals representing transducer C comprises the steps of generating signals representing a determinized version of $C^{-1}$, and generating signals representing the inverse of said determinized version of $C^{-1}$.

3. The method of claim 1 wherein said step of generating signals representing P' comprises generating signals representing a transducer L', a disambiguated version of L, generating signals representing a transducer G', a disambiguated version of G, generating signals representing a transducer L'BG' that is a determinized version of the composition of L' and G'.

4. The method of claim 3, wherein said step of generating signals representing L' comprises labeling with auxiliary labels those paths in L that map input strings to outputs in excess of a first output.

5. The method of claim 3, wherein said step of generating signals representing G' comprises labeling with auxiliary labels those paths that map input strings to context sequences in excess of a first context sequence.

6. The method of claim 4, wherein said step of generating signals representing G' comprises labeling with auxiliary labels those paths that map input strings to context sequences in excess of a first context sequence.

7. The method of claim 6, where in said step of generating signals representing P comprises steps of modifying said transducer P' by replacing said auxiliary labels by $\epsilon$, and removing $\epsilon$-arcs in said modified version of P'.

8. The method of claim 1 wherein said language model, G, is an n-gram model, where n is a positive integer.

9. The method of claim 8 wherein n=2.

10. The method of claim 8 wherein n=3.

11. The method of claim 1 wherein said context dependency transducer, said inverse transducer $C^{-1}$, the determinized version of $C^{-1}$ and the inverse of the determinized version of $C^{-1}$ are cross-word context transducers.

12. The method of claim 1 wherein said combined weighted transducer is fully expanded.

13. The method of claim 1 wherein G is a weighted transducer.

14. The method of claim 1 wherein L is a weighted transducer.

15. The method of claim 1 wherein G and L are weighted transducers.

16. A combined weighted speech transducer for use in a large-vocabulary context-dependent speech recognizer, said transducer stored in a memory system and being based on signals representing: (i) the inverse, $C^{-1}$, of a context-dependency transducer; (ii) a word pronunciation transducer, L; and (iii) a language model transducer, G; said transducer comprising signals representing C B P, the composition of transducers C and P, where transducer C comprises signals representing the inverse of a determinized version of transducer $C^{-1}$, transfer P comprises signals representing a minimized version of a transducer P', where transducer P' is a determinized version of the composition L'BG', of disambiguated versions of each of said transducers L and G.

17. A large-vocabulary, context-dependent speech recognizer comprising a. a feature extractor for extracting features of input speech signals and applying sequences of one or more labels to said features, b. a combined weighted speech transducer for use in a speech recognizer, said transducer being stored in a memory system and being based on signals representing: (i) the inverse, $C^{-1}$, of a context-dependency transducer; (ii) a word pronunciation transducer, L; and (iii) a language model transducer, G; said combined speech transducer comprising signals representing C B P, the composition of transducers C and P, where transducer C comprises signals representing the inverse of a determinized version of transducer $C^{-1}$, and transducer P comprises signals representing a minimized version of a transducer P', where transducer P' is a determinized version of the composition L'BG', of disambiguated versions of each of said transducers L and G, and c. a decoder for outputting decisions about said input speech signals based on said sequences of labels and said combined speech transducer.

18. The speech recognizer of claim 17 wherein said decoder is a single-pass decoder.

19. The speech recognizer of claim 17 wherein said decoder is a Viterbi decoder.

20. The speech recognizer of claim 19 wherein said combined weighted speech transducer is fully expanded.

* * * * *